(12) United States Patent
Breuer et al.

(10) Patent No.: US 7,548,528 B2
(45) Date of Patent: Jun. 16, 2009

(54) METHOD FOR ASSIGNING AND METHOD FOR SCHEDULING CODES FOR DATA TRANSMISSIONS, BETWEEN A RADIO STATION AND AT LEAST ONE SUBSCRIBER STATION, OVER AN AIR INTERFACE OF A RADIOCOMMUNICATION SYSTEM, TOGETHER WITH NETWORK-SIDE EQUIPMENT AND RADIO STATION

(75) Inventors: Volker Breuer, Botzow (DE); Steffen Junghanns, Langenau (DE); Frank Lamprecht, Berlin (DE); Armin Splett, Ulm (DE); Thomas Ulrich, Bad Duerkheim (DE); Gunter Wolff, Ulm (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 702 days.

(21) Appl. No.: 11/349,269

(22) Filed: Feb. 8, 2006

(65) Prior Publication Data
US 2006/0193304 A1   Aug. 31, 2006

(30) Foreign Application Priority Data
Feb. 8, 2005   (EP) .................................. 05002620

(51) Int. Cl.
*H04B 7/216* (2006.01)
(52) U.S. Cl. ...................................... 370/335; 370/342
(58) Field of Classification Search ................. 370/328, 370/335, 338, 342, 441
See application file for complete search history.

(56) References Cited

U.S. PATENT DOCUMENTS

| | | | | |
|---|---|---|---|---|
| 6,693,952 | B1* | 2/2004 | Chuah et al. | 375/140 |
| 6,885,653 | B2* | 4/2005 | Choi et al. | 370/342 |
| 7,280,512 | B2* | 10/2007 | Lim et al. | 370/335 |
| 2002/0191579 | A1 | 12/2002 | Terry et al. | |
| 2003/0185281 | A1 | 10/2003 | Roh | |
| 2004/0081130 | A1 | 4/2004 | Virtanen | |
| 2005/0053041 | A1* | 3/2005 | Cheong | 370/335 |
| 2006/0120322 | A1* | 6/2006 | Lindskog et al. | 370/329 |

OTHER PUBLICATIONS

Shanbhg et al.; "Peak-to-Average Reduction Via Optimal Walsh Code Allocation in Third Generation CDMA Systems"; IEEE Sixth Int'l Symposium on Spread Spectrum Techniques and Applications, Sep. 2000, vol. 2; pp. 560-564.
3GPP TS 25.213 V5.5.0 (Dec. 2003), 3rd Generation Partnership Project; Technical Specification Group Radio Access Network; Spreading and Modulation (FDD) Release 5), Chapter 4.3.1.1, p. 11.

(Continued)

*Primary Examiner*—Ricky Ngo
*Assistant Examiner*—Christine Ng
(74) *Attorney, Agent, or Firm*—Staas & Halsey LLP

(57) ABSTRACT

Codes are assigned and scheduled for data transmissions, between a radio station and at least one subscriber station, over a wireless interface of a radio communication system, in such a way that both for transmissions in the upward direction (uplink), from subscriber stations to the radio station, and also for transmissions in the downward direction (downlink), from the radio station to subscriber stations, the lowest possible signal-to-average ratio can be achieved.

11 Claims, 2 Drawing Sheets

OTHER PUBLICATIONS

3GPP TS 25.433 V5.9.0 (Jun. 2004), 3rd Generation Partnership Project, Technical Specification Group Radio Access Network; UTRAN Lub Interface NBAP Signalling (Release 5), Chapter 9.2.2.18F, pp. 314-315.

European Search Report for European Application No. EP 05 00 2620; mailed Jun. 30, 2005.

* cited by examiner

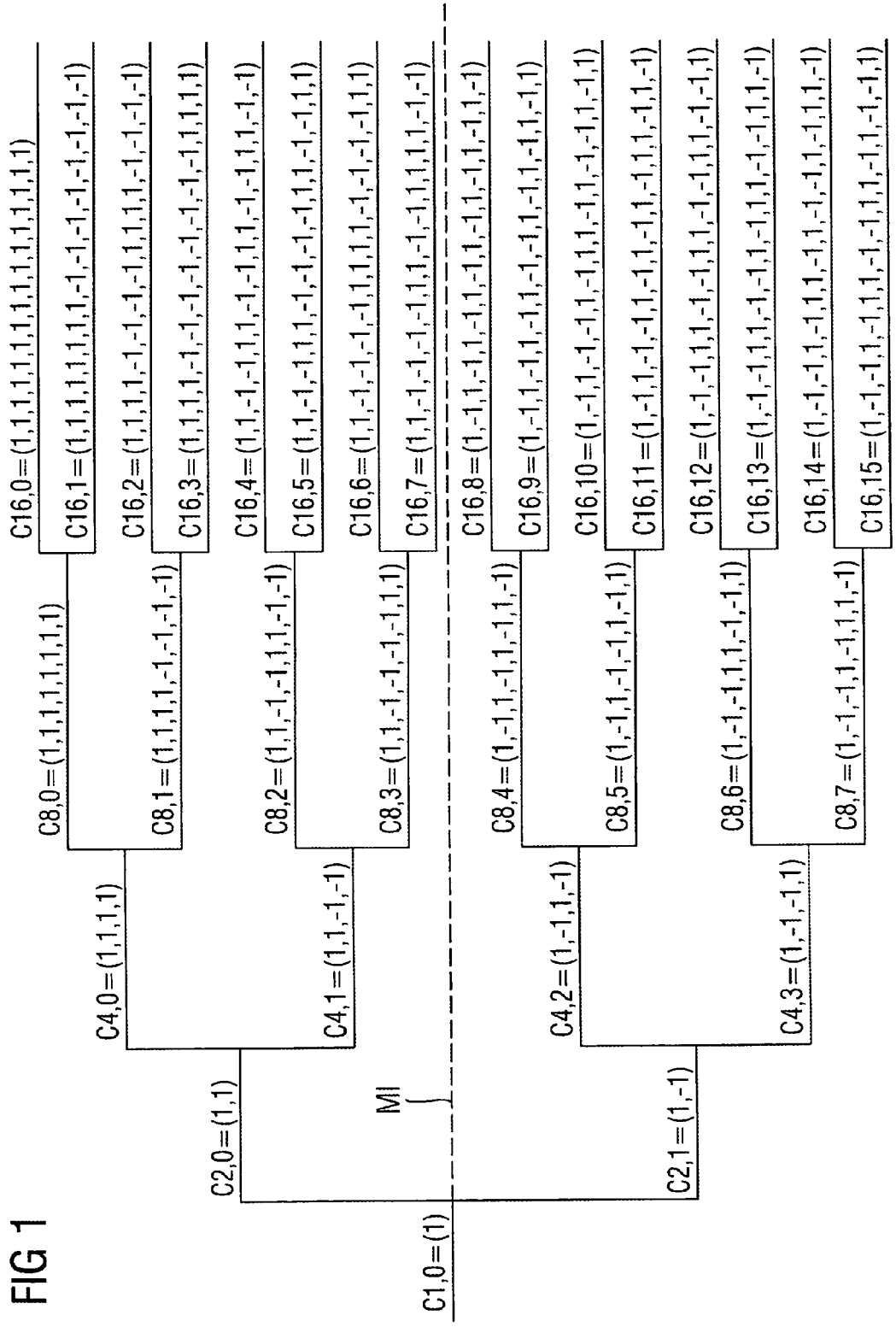

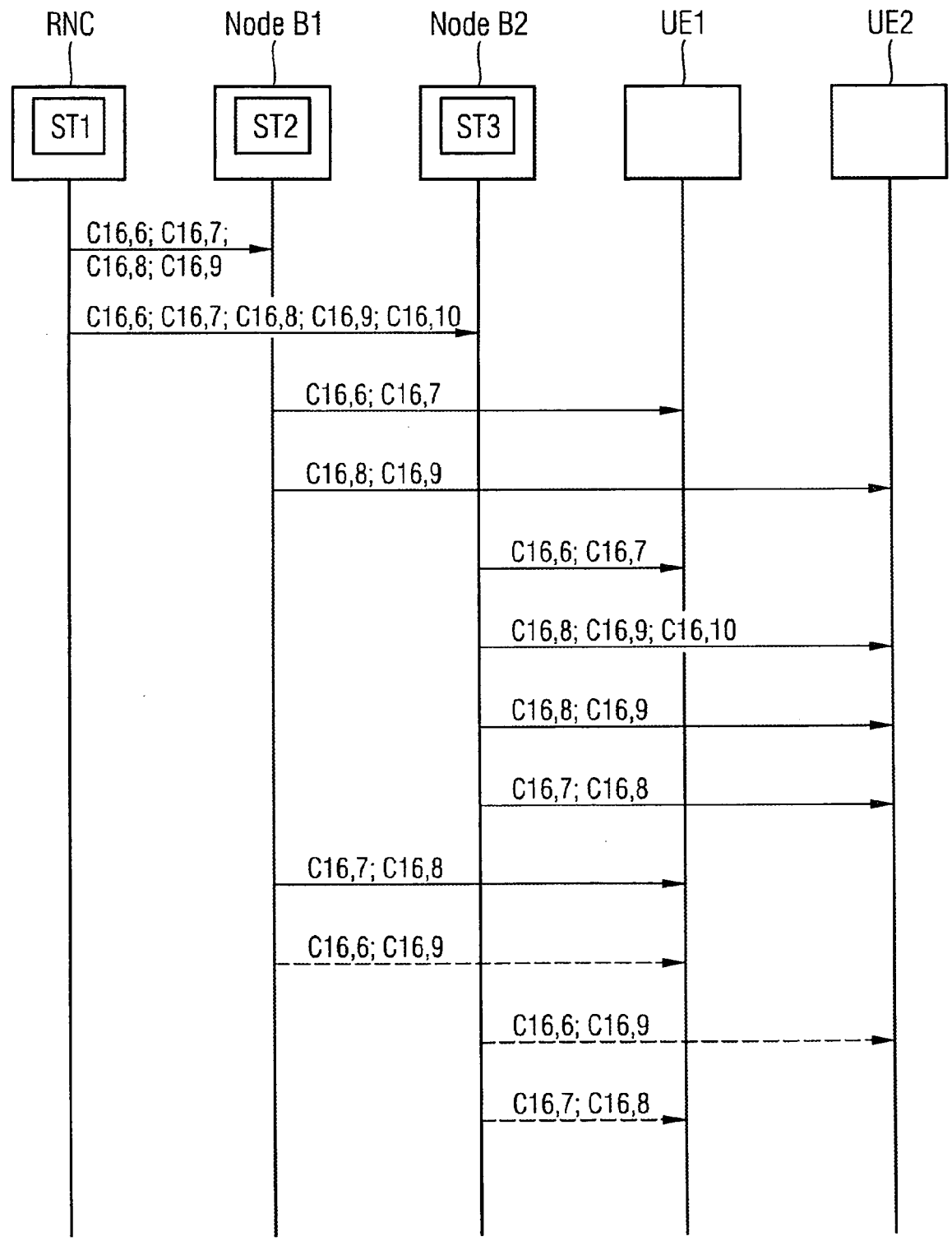

METHOD FOR ASSIGNING AND METHOD FOR SCHEDULING CODES FOR DATA TRANSMISSIONS, BETWEEN A RADIO STATION AND AT LEAST ONE SUBSCRIBER STATION, OVER AN AIR INTERFACE OF A RADIOCOMMUNICATION SYSTEM, TOGETHER WITH NETWORK-SIDE EQUIPMENT AND RADIO STATION

CROSS REFERENCE TO RELATED APPLICATIONS

This application is based on and hereby claims priority to European Application No. 05002620 filed on Feb. 8, 2005, the contents of which are hereby incorporated by reference.

BACKGROUND OF THE INVENTION

1. Field of the Invention

The invention relates to a method for assigning and a method for scheduling codes for data transmissions, between a radio station and at least one subscriber station, over an air interface of a radio communication system, together with appropriate network-side equipment and an appropriate radio station 2. Description of the Related Art In radio communication systems with a CDMA component (CDMA: Code Division Multiplex Access), use is made of orthogonal codes to enable subscriber stations and/or transmission channels to be distinguished. Examples of orthogonal codes are so-called OVSF codes (OVSF: Orthogonal Variable Spreading Factor), such as are described for example in section 4.3.1.1 of the 3GPP (3rd Generation Partnership Project) Standard document, TS 25.213 V5.5.0 (2003-12). Orthogonal codes can be represented in the form of a code tree, as shown in FIG. 4 for the OVSF codes in the aforementioned standard document. Each level of the code tree corresponds to a spreading factor, and has as many branches as the numeric value of the spreading factor. For example, with a spreading factor of 4 the corresponding level in the code tree has four branches, and each of the codes corresponding to the branches has a length of four bits. With a spreading factor of 16, the corresponding level has sixteen branches and each of the codes has a length of sixteen bits.

Depending on the combination of codes which a subscriber station or a radio station uses simultaneously for data transmissions, there is in each case a resulting maximum signal-to-average ratio (PAR: Peak-to-Average Ratio) for the transmission power. The signal-to-average ratio of the transmission power gives the ratio of an instantaneous value of the transmission power to the transmission power averaged over time.

According to section 9.2.2.1 8F of the 3GPP standard TS 25.433 V5.9.0 (2004-06) radio stations must, for example, use consecutive codes for transmissions using HSDPA (High Speed Downlink Packet Access). This means that the codes which can be used by a radio station must correspond to branches which lie contiguously adjacent to one another at the level in the code tree corresponding to the chosen spreading factor. The radio stations must therefore be configured by manufacturers in such a way that for every possible combination of codes they are always able to adhere to the corresponding maximum possible signal-to-average ratio. This means that the largest possible value of the signal-to-average ratio determines in each case how a transmission power amplifier must be dimensioned for a radio station. Since subscriber stations can also use several codes for transmissions in the upward direction (uplink), there are also different combinations of codes for subscriber stations. Hence, a transmission power amplifier for a subscriber station must also be dimensioned so that it is possible to adhere to a maximum possible signal-to-average ratio.

SUMMARY OF THE INVENTION

It is therefore an object of the invention to specify a method for assigning codes for data transmissions over an air interface between a radio station and a subscriber station in a radio communication system, together with network-side equipment and a radio station, which enable the assigned codes to be scheduled over time in such a way that the signal-to-average ratio of the subscriber station and/or of the radio station is less than a maximum possible value which can arise with any arbitrary assignment or scheduling of the codes by the subscriber station and/or the radio station.

In the case of a method in accordance with the invention, for assigning codes for data transmissions between a radio station and at least one subscriber station, over an air interface of a radio communication system, there are M codes available for assignment, where each of the M codes can be represented as a branch at the same level in a code tree, so that a first half of the branches originates from a first parent branch and a second half of the branches originates from a second parent branch, network-side equipment assigns to the radio station a number of N codes taken from the M codes in such a way that the branches, in the representation at the level, which correspond to the N codes lie contiguously adjacent to each other and it is the case that: N is greater than or equal to two, $N>=2$, and M is greater than or equal to two multiplied by N, $M>=2*N$. In accordance with an aspect of the invention, from the branches in the representation at the level which correspond to the N codes, the N/2 branches originate from the first parent branch and the N/2 branches from the second parent branch if N is an even number or, if N is an odd number, the $(N-1)/2$ branches originate from the first parent branch and the $(N+1)/2$ branches from the second parent branch.

In accordance with an aspect of the invention, the assignment of codes to the radio station makes it possible, for any particular number of assigned codes, to make available to the radio station for scheduling, i.e. for simultaneous use, codes which originate from the first parent branch, corresponding to a first parent code, and of codes which originate from the second parent branch, corresponding to a second parent code, which are as nearly as possible the same in number. This approach ensures that, for any particular number of assigned codes, the largest possible number of codes can be used in a method in accordance with the invention for scheduling codes, as described below.

In this application, the expression "a branch originates from a parent branch" means that the branches which correspond to a code "arise" by a branching of the corresponding parent branch. Mathematically, this means that the codes are calculated from the parent code concerned by the application, possibly repeatedly, of a computational rule.

In what follows, we speak both of codes which lie contiguously adjacent to one another and also of branches which lie contiguously adjacent to one another. These formulations refer to the same situation, and are therefore to be regarded as synonymous in this application.

With a method in accordance with the invention for scheduling codes for data transmissions between a radio station and at least one subscriber station, over an air interface of a radio communication system, there is a number of N codes taken from M codes available to the radio station for scheduling, where each of the M codes can be represented as a branch at the same level in a code tree, so that the first half of the branches originates from a first parent branch and the second half of the branches from a second parent branch, and it is the case that: N is greater than or equal to two, N>=2, and M is greater than or equal to two multiplied by N, M>=2*N. In accordance with an aspect of the invention, the radio station schedules a number K, where K>=2, of the N codes for simultaneous data transmissions between the radio station and subscriber stations, so that each code is only scheduled once and from the branches in the representation at the level which correspond to the K codes K/2 branches originate from the first parent branch and K/2 branches from the second parent branch if K is an even number or, if K is an odd number, (K−1)/2 branches originate from the first parent branch and (K+1)/2 branches from the second parent branch.

The inventors have realized that if scheduling of codes is effected in the manner described above the result is that the radio station and/or the subscriber stations have a signal to average ratio which is lower than with other possible combinations of codes. For such an embodiment of the code scheduling, the relevant transmission power amplifier for the radio station and/or the subscriber stations can meet less demanding technical requirements, for example in respect of its linearity. For a manufacturer of the radio station and/or the subscriber stations, this is associated with a reduction in the manufacturing costs.

In the case of a further method in accordance with the invention, the previously described method of assignment in accordance with the invention is carried out as a first step and in a second step, which takes place at some time after the first step, the previously described method of scheduling in accordance with the invention is carried out.

The advantage lies in that, by assigning codes in accordance with the invention, all the assigned codes correspond to branches which lie contiguously adjacent to each other, and hence can be used for a method of scheduling codes in accordance with the invention.

In a development of the invention, the K codes are calculated in such a way that the branches corresponding to the K codes lie contiguously adjacent to each other for each subscriber station.

Because the structure of the code tree is known and unique, it is then sufficient to signal to each subscriber station a start code and an end code or a start code and the number of codes scheduled for the corresponding subscriber station. From these items of data, the subscriber stations can determine for themselves in each case the individual codes scheduled. If the branches corresponding to the scheduled codes are not contiguously adjacent to each other, then in the most unfavorable case each code must be signaled to each subscriber station. This does increase the signaling load, but it does not of course have any detrimental effect on a scheduling method in accordance with the invention.

A further embodiment of the invention provides for the scheduling of codes being terminated for at least one subscriber station, and the existing schedule of codes for the remaining subscriber stations being amended by another application of the method previously described for code scheduling in accordance with the invention. It is advantageous in this case if the branches which correspond to the codes used lie contiguously adjacent to each other for the remaining subscriber stations.

This approach makes it possible, if at least one subscriber station is no longer receiving or transmitting data, i.e. if the scheduling of codes for at least one subscriber station is terminated, to reestablish a schedule of codes in accordance with the invention which has an equal spread between codes corresponding to branches which originate in the first parent branch and in the second parent branch.

A network-side equipment in accordance with an aspect of the invention and a radio station in accordance with an aspect of the invention have all the characteristics required for carrying out an appropriate method in accordance with the invention. In particular, appropriate facilities can be provided for carrying out the individual steps in the methods described above or variants of the method.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is an extract from a code tree for OVSF codes conforming to 3GPP TS 25.213 V5.5.0 (2003-12), FIG. 2 is a schematic diagram of an assignment in accordance with the invention, together with a schedule of codes in accordance with the invention for codes as shown in FIG. 1.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

An example of a subscriber station is a mobile radio terminal device, in particular a mobile telephone or also a moveable location or fixed location device for the transmission of image and/or sound data, for sending faxes, SMS (Short Message Service) messages, MMS (Multimedia Messaging Service) messages and/or e-mails and/or for accessing the Internet.

A radio station, for example a base station, is network-side equipment which receives user and/or signaling data from a subscriber station and/or transmits user and/or signaling data to the subscriber station, over an air interface.

A radio station is linked via further network-side equipment into a core network, via which connections are effected to other radio communication systems or into other data networks. The term data network refers, for example, to the Internet or a fixed network with, for example, circuit-switched or packet-switched connections, for example for voice and/or data.

The other network-side equipment also includes, for example, a radio network controller which assigns to the radio station resources for data transmissions, for example in the form of codes.

The invention can be used advantageously in any arbitrary radio communication systems with a CDMA component. The term radio communication systems refers to systems in which a data transmission is effected between subscriber stations and radio stations over an air interface. This data transmission can be both bidirectional and unidirectional. Radio communication systems are, in particular, any mobile radio systems conforming for example to the GSM (Global System for Mobile Communications) or UMTS (Universal Mobile Telecommunications System) standards. Future mobile radio systems, for example of the fourth generation, together with ad-hoc networks, are also to be considered as radio communication systems. Examples of radio communication systems include wireless local networks (WLANs: Wireless Local Area Networks) conforming to the IEEE (Institute of Electrical and Electronics Engineers) standards 802.11a-i, HiperLAN1 and HiperLAN2 (HiperLAN: high performance radio local area network), together with Bluetooth networks and broadband networks with wireless access, conforming for example to IEEE 802.16.

The invention is described below using as an example a mobile radio system conforming to the UMTS standard, but this is not intended as an expression that the invention is to be restricted to this.

In what follows the radio station is considered to be a base station, but this is not intended as an expression that the invention is to be restricted to this.

In what follows the network-side equipment is considered to be a radio network controller (RNC), but this is not intended as an expression that the invention is to be restricted to this.

FIG. 1 shows a schematic representation of a code tree for OVSF codes conforming to the UMTS standard 3GPP TS 25.213 V5.5.0 (2003-12). It shows codes with spreading factors of 1, 2, 4, 8 and 16. For reasons of clarity, higher spreading factors are not shown. Each level in the code tree has codes with the same value of the spreading factor. The spreading factor specifies the number of bits of which the codes consist at the level concerned.

In FIG. 1, the codes have reference marks in the form $C_{n,k}$, where n is the value of the spreading factor and k the number of the code, where $0 \leq k < n-1$. The codes on each level of the code tree, i.e. the codes with a particular spreading factor, can be calculated, in accordance with the computational rule specified in section 4.3.1.1 of the above-cited UMTS standard, from the preceding level, i.e. from the codes with the next-smaller spreading factor. At the second level of the code tree, i.e. with a spreading factor of n=2, there is a first code $C_{2,0}$ on a branch designated as the first parent branch, and a second code $C_{2,1}$ on a branch designated as the second parent branch. Of the branches which correspond to codes at higher levels, i.e. levels with spreading factors of 4, 8, 16 and with higher spreading codes, the first halves of the branches originate from the first parent branch while the second halves of the branches originate from the second parent branch. The code tree consists, so to speak, of two halves, which are separated in FIG. 1 by a dashed line MI. On one side of this dashed line MI lie those branches, i.e. the corresponding codes, which originate from the first parent branch, i.e. from the first code $C_{2,0}$. On the other side of the dashed line MI lie those branches, i.e. those codes, which originate from the second parent branch, i.e. from the second code $C_{2,1}$.

FIG. 2 shows schematically an assignment and scheduling of codes in accordance with an aspect of the invention for spreading factor 16. The assignment and scheduling of codes is represented by appropriate arrows, and by specifying the reference characters of the assigned and scheduled codes. For reasons of clarity, the codes arranged on an arrow are separated by semicolons. The invention can of course be used both for smaller and also for larger spreading factors.

In this exemplary embodiment, the codes for data transmissions from radio stations to subscriber stations (downlink) are assigned and scheduled using HSDPA, but this is not intended as an expression that the invention is to be restricted to this. The invention can of course also be used for MBMS data transmissions (MBMS: Multimedia Broadcast Multicast Service), or to assign codes to subscriber stations for transmissions in the upward direction (uplink) and/or to have the assigned codes scheduled by the subscriber station.

If a spreading factor of 16 is used, a radio network controller RNC then has the possibility of assigning all the 16 codes that have been reserved, shown in FIG. 1 for a spreading factor of 16, to a first base station NodeB1 and a second base station NodeB2. In this exemplary embodiment, the radio network controller RNC assigns four codes to the first base station NodeB1 and five codes to the second base station NodeB2. In accordance with an aspect of the invention, the assigned codes lie contiguously adjacent to one another and symmetrically about the dashed line MI in FIG. 1. This is equivalent to saying that the radio network controller RNC assigns to the first base station NodeB1 the codes $C_{16,6}$, $C_{16,7}$, $C_{16,8}$ and $Cl_{6,9}$. As can be seen from FIG. 1, these four codes $C_{16,6}$, $C_{16,7}$, $C_{16,8}$, $C_{16,9}$ lie contiguously adjacent to one another and symmetrically about the dashed line MI. A symmetrical arrangement of the codes is to be understood in the sense that the codes $C_{16,6}$ and $C_{16,7}$ lie on branches which originate from the first parent branch, i.e. originate from the first code $C_{2,0}$, while the codes $C_{16,8}$ and $C_{16,9}$ lie on branches which originate from the second parent branch, i.e. originate from the second code $C_{2,1}$. Thus the number of branches lying on each side of the dashed line MI is the same.

The radio network controller RNC assigns five codes to the second base station NodeB2. These are assigned in such a way that they lie contiguously adjacent to one another and as symmetrically as possible about the dashed line MI. The radio network controller RNC thus assigns the codes $C_{16,6}$, $C_{16,7}$, $C_{16,8}$, $C_{16,9}$ and $C_{16,10}$. The radio network controller RNC would have been able to achieve an arrangement for five codes which is equally as near as possible symmetrical relative to the dashed line MI by assigning to the second base station NodeB2 the code $C_{16,5}$ instead of the code $C_{16,10}$. "As symmetrical as possible" is thus to be understood in the sense that the number of branches (codes) which originate from the first parent branch (first code) differs only by one from the number of braches (codes) which originate from the second parent branch (second code).

Thereafter, the first base station NodeB1 and the second base station NodeB2 act as scheduling unit(s) to carry out the scheduling of the codes, assigned to them by the radio network controller RNC, for a first subscriber station UE1 and a second subscriber station UE2. The codes for data transmissions, from the first base station NodeB1 and the second base station NodeB2 to the first subscriber station UE1 and to the second subscriber station UE2, are in turn scheduled symmetrically about the dashed line MI in FIG. 1, and preferably in such a way that for any one subscriber station the codes used are neighboring codes, i.e. codes on branches which lie adjacent to one another.

For a simultaneous data transmission to the first and second subscriber stations UE1, UE2 using HSDPA, the first base station NodeB1 therefore schedules the code $C_{16,6}$ and the code $C_{16,7}$ for the first subscriber station UE1, and the code $C_{16,8}$ and the code $C_{16,9}$ for the second subscriber station UE2.

Likewise, for a simultaneous data transmission to the first and second subscriber stations UE1, UE2 using HSDPA, the second base station NodeB2 schedules the code $C_{16,6}$ and the code $C_{16,7}$ for the first subscriber station UE1, and the codes $C_{16,8}$, $C_{16,9}$ and $C_{16,10}$ for the second subscriber station UE2. While the second base station NodeB2 continues to transmit to the first subscriber station UE1 using the codes $C_{16,6}$ and $C_{16,7}$ it alters the resource schedule for the second subscriber station UE2 in a subsequent step, because a lower data transmission rate is now required. Hence, it thereafter only schedules the codes $C_{16,8}$ and $C_{16,9}$ for data transmission to the second subscriber station UE2 using HSDPA. The code C16,10 which is now non-scheduled can be used, for example, for a third subscriber station, which is not shown.

Next, the second base station NodeB2 terminates its data transmission to the first subscriber station UE1. As a result of the fact that the second base station NodeB2 is no longer using the code C16,6 and the code C16,7 a schedule using the codes C16,8 and C16,9 for the second subscriber station UE2 means that there is no longer a symmetrical schedule with respect to the dashed line MI. In order to be able to carry out its data transmission with the lowest possible signal-to-average ratio, the second base station NodeB2 therefore changes the schedule of codes for the second subscriber station UE2, in accordance with an aspect of the invention, and subsequently uses the code C16,7 together with the code C16,8 for the continuation of the data transmission. Like the code C16, 9, the code C16,6 is no longer scheduled by the second base station NodeB2. The codes C16,6 and C16,9 are thus available for rescheduling.

Meanwhile, the first base station NodeB1 has terminated its data transmission to the second subscriber station UE2. As a result of the fact that the first base station NodeB1 is no longer using the code C16,8 and the code C16,9 a schedule using the codes C16,6 and C16,7 for the first subscriber station UE1 means that there is no longer a symmetrical schedule with respect to the dashed line MI. In order to be able to continue carrying out its data transmission with as low a signal-to-average ratio as possible, the first base station NodeB1 therefore changes the schedule of codes for the first subscriber station UE1, in accordance with an aspect of the invention, and subsequently uses the code C16,7 together with the code Cl 6,8 for the continuation of the data transmission. Like the code C16,9, the code C16,6 is no longer scheduled by the first base station NodeB1. The codes C16,6 and C16,9 are thus available for rescheduling.

Provision is also made in accordance with an aspect of the invention for the possibility of the code being scheduled symmetrically about the dashed line MI without these codes necessarily lying contiguously adjacent to each other, i.e. having to lie on neighboring branches. In this case, in an alternative exemplary embodiment represented by a dashed arrow, for the continuation of its data transmission to the first subscriber station UE1 the base station NodeB1 changes the schedule of codes from the codes C16,6 and C16,7 to the codes C16,6 and C16,9. The second base station NodeB2 also schedules the same codes for a continuation of its data transmission to the second subscriber station UE2. As a result of this scheduling, the second base station NodeB2 can subsequently schedule the codes C16,7 and C16,8 for a new data transmission to the first subscriber station. Thus, codes which lie adjacent to each other are used for the first subscriber station UE1, without the need to effect a new change in the resource schedule for the second subscriber station.

The radio network controller RNC provides a first control unit ST1 acting as an assignment unit which can perform an assignment of codes, in accordance with the invention, for base stations. The first base station NodeB1 provides a second control unit ST2 and the second base station NodeB2 provides a third control unit ST3. By their control units ST2 and ST3 acting as scheduling units, the first base station NodeB1 and the second base station NodeB2 can perform the scheduling previously described of the codes assigned to them for data transmissions to the first subscriber station UE2 and the second subscriber station UE2.

In an exemplary embodiment which is not illustrated, the first base station NodeB1 and the second base station NodeB2 allocate in the same way to the first and second subscriber stations UE1, UE2 codes which lie contiguously adjacent to each other and symmetrically about the dashed line MI, as has previously been described for the radio network controller RNC in respect of the first and second base stations NodeB1, NodeB2. After this, the first subscriber station UE1 and the second subscriber station UE2 schedule the codes assigned to them, again symmetrically about the dashed line MI as has previously been described for the first base station NodeB1 and the second base station NodeB2.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

What is claimed is:

1. A method for assigning codes for data transmissions between a radio station and at least one subscriber station over a wireless interface of a radio communication system, where M codes are available for assignment and each of the M codes corresponds to a branch at a same level in a code tree, so that a first half of M branches originates from a first parent branch and a second half of the M branches originates from a second parent branch, comprising:

assigning in network-side equipment in the radio station N codes taken from the M codes in such a way that N branches corresponding to the N codes in the representation at the same level lie contiguously adjacent to one another, where N is at least two and M is at least two multiplied by N and, of the N branches corresponding to the N codes in the representation at the same level, an equal number of the N branches originate from each of the first and second parent branches if N is an even number, while (N−1)/2 branches originate from the first parent branch and (N+1)/2 branches originate from the second parent branch if N is an odd number.

2. A method as recited in claim 1, further comprising scheduling by the radio station K codes of the N codes for simultaneous data transmissions between the radio station and subscriber stations after said assigning, where K is at least two, each of the K codes is only scheduled once and, of K branches corresponding to the K codes in the representation at a level, half originate from each of the first and second parent branches if K is an even number, while (K−1)/2 branches originate from the first parent branch and (K+1)/2 branches originate from the second parent branch, if K is an odd number.

3. A method as recited in claim 2, wherein the K branches corresponding to the K codes lie contiguously adjacent to one another for each subscriber station.

4. A method in accordance with claim 3, further comprising terminating said scheduling of the K codes for at least one subscriber station; and amending any existing schedule of codes for remaining subscriber stations by repeating said scheduling.

5. A method for scheduling codes for data transmissions between a radio station and at least one subscriber station over a wireless interface of a radio communication system, where the radio station has available for scheduling N codes taken from M codes, where each of the M codes corresponds to a branch at a same level in a code tree, so that a first half of M branches originates from a first parent branch and a second half of the M branches originates from a second parent branch, and where N is greater at least two and M is at least two multiplied by N, comprising:

scheduling by the radio station K codes of the N codes for simultaneous data transmissions between the radio station and subscriber stations, where K is at least two, each of the K codes is only scheduled once and, of K branches corresponding to the K codes in the representation at a level, half originate from each of the first and second parent branches if K is an even number, while $(K-1)/2$ branches originate from the first parent branch and $(K+1)/2$ branches originate from the second parent branch if K is an odd number.

6. A method as recited in claim 5, wherein the K branches corresponding to the K codes lie contiguously adjacent to one another for each subscriber station.

7. A method in accordance with claim 6, further comprising terminating said scheduling of the K codes for at least one subscriber station; and amending any existing schedule of codes for remaining subscriber stations by repeating said scheduling.

8. Network-side equipment for a radio communication system, comprising:

a reservation unit reserving M codes, where each of the M codes corresponds to a branch at a same level in a code-tree, so that a first half of M branches originates from a first parent branch and the second half of the M branches originates from a second parent branch; and an assignment unit assigning codes for data transmissions between a radio station and at least one subscriber station over a wireless interface, in such a way that N codes taken from the M codes are assigned to the radio station, so that N branches corresponding to the N codes in the representation at the same level lie contiguously adjacent to one another, where N is at least two and M is at least two multiplied by N and, of N branches corresponding to the N codes in the representation at the same level, half of the N branches originate from each of the first and second parent branches if N is an even number, while $(N-1)/2$ branches originate from the first parent branch and $(N+1)/2$ branches from the second parent branch if N is an odd number.

9. A radio station for a radio communication system, comprising:

at least one scheduling unit scheduling K codes, for data transmissions between the radio station and at least one subscriber station over a wireless interface, from N available codes taken from M codes, where each of the M codes corresponds to a branch at a same level in a code tree, so that a first half of M branches originates from a first parent branch and a second half of the M branches originates from a second parent branch, where N is at least two and M is at least two multiplied by N, where K is at least two of the N codes scheduled for simultaneous data transmissions between the radio station and subscriber stations, so that each of the K codes is only scheduled once and, of K branches corresponding to the K codes in the representation at a level, half originate from each of the first and second parent branches if K is an even number, while $(K-1)/2$ branches originate from the first parent branch and $(K+1)/2$ branches originate from the second parent branch if K is an odd number.

10. A radio station in accordance with claim 9, wherein the K branches corresponding to the K codes lie contiguously adjacent to one another for each subscriber station.

11. A radio station in accordance with claim 10, wherein said at least one scheduling unit, after the scheduling of the K codes for at least one subscriber station is terminated, amends an existing schedule of the K codes for remaining subscriber stations by repeating the scheduling.

\* \* \* \* \*